United States Patent
Höglauer et al.

(10) Patent No.: US 11,718,049 B2
(45) Date of Patent: Aug. 8, 2023

(54) TREATMENT MACHINE FOR A FLEXIBLE MATERIAL WEB, IN PARTICULAR PLASTIC FILM, WHICH CAN BE PASSED THROUGH A TREATMENT FURNACE

(71) Applicant: BRÜCKNER MASCHINENBAU GmbH, Siegsdorf (DE)

(72) Inventors: Christoph Höglauer, Waging am See (DE); Markus Unterreiner, Marquartstein (DE); Anton Wettemann, Vachendorf (DE)

(73) Assignee: BRÜCKNER MASCHINENBAU GmbH, Siegsdorf (DE)

( * ) Notice: Subject to any disclaimer, the term of this patent is extended or adjusted under 35 U.S.C. 154(b) by 697 days.

(21) Appl. No.: 16/590,437

(22) Filed: Oct. 2, 2019

(65) Prior Publication Data
US 2020/0108572 A1    Apr. 9, 2020

(30) Foreign Application Priority Data

Oct. 4, 2018    (DE) ..................... 10 2018 124 521.1

(51) Int. Cl.
B29C 71/02    (2006.01)
B29C 55/02    (2006.01)

(52) U.S. Cl.
CPC .............. B29C 71/02 (2013.01); B29C 55/02 (2013.01); *B29C 2071/022* (2013.01)

(58) Field of Classification Search
CPC .............. B29C 37/0089; B29C 71/02; B29C 2071/022; B29C 35/06; B29C 35/045; B05B 13/0278; F27B 9/028; F27B 9/28
See application file for complete search history.

(56) References Cited

U.S. PATENT DOCUMENTS 3,270,655 A * 9/1966 Guirl ..................... F24F 13/072
                                                     454/192
3,618,919 A * 11/1971 Beck ....................... C21D 1/74
                                                     34/209
(Continued)

FOREIGN PATENT DOCUMENTS

CN    101267929    9/2000
CN    1684817    10/2005
(Continued)

OTHER PUBLICATIONS

Chinese Office Action cited in 201910950031.6 dated May 8, 2021, 10 pages.

*Primary Examiner* — Jeffrey M Wollschlager
(74) *Attorney, Agent, or Firm* — Nixon & Vanderhye P.C.

(57) ABSTRACT

A treatment machine comprises at least two successive zones in an extraction direction of the material web between which a neutral zone is provided. In the neutral zone, a nozzle arrangement is provided adjacent to a zone exit wall and/or to a leading neutral zone wall on the one hand, and/or adjacent to the chamber inlet wall and/or a trailing neutral zone wall on the other hand, via which nozzle arrangement a gaseous fluid flow reaching a material web is generated. The nozzle arrangement is designed as follows: the respective gaseous fluid flow is directed at a blowing angle in the direction of the adjacent zone exit wall and/or the leading neutral zone wall or the zone inlet wall and/or the trailing neutral zone wall; and the gaseous fluid flow flows as far as the material web, following the zone exit wall, the leading neutral zone wall or the zone inlet wall and/or the trailing neutral zone wall.

12 Claims, 6 Drawing Sheets

(56) References Cited

U.S. PATENT DOCUMENTS

Figure 1:
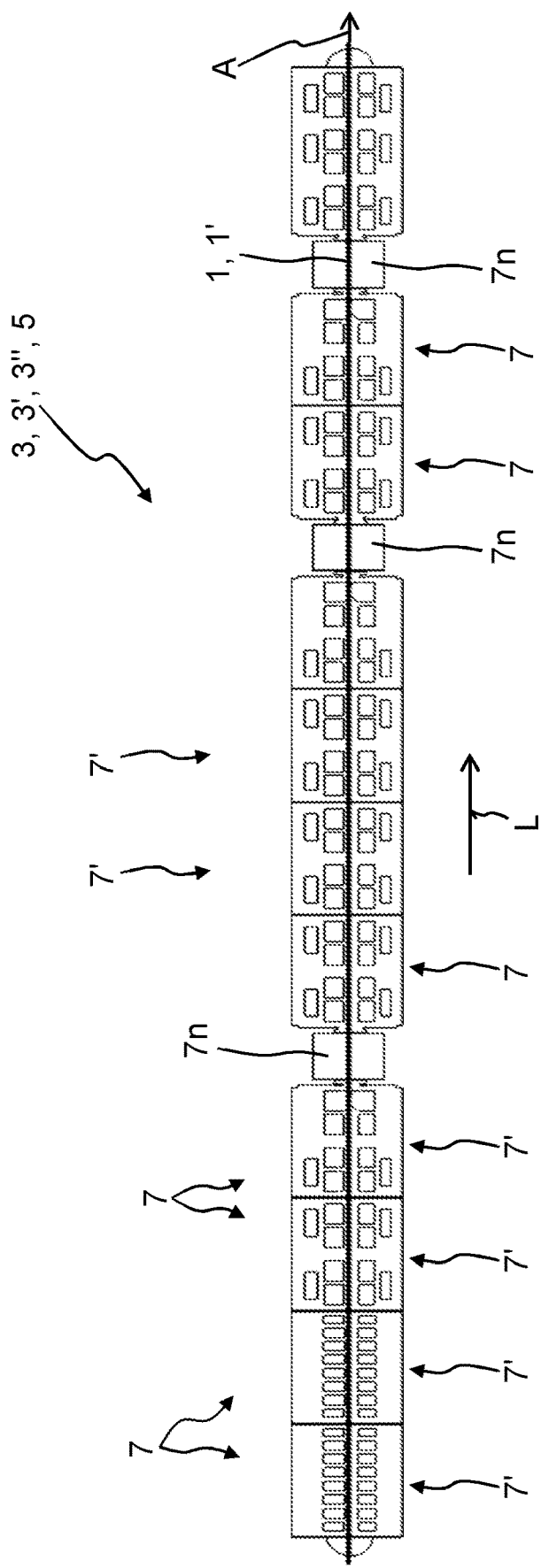

| | | | | |
|---|---|---|---|---|
| 3,909,953 | A | * | 10/1975 | Hemsath ................ F23G 7/065 422/198 |
| 4,094,627 | A | * | 6/1978 | Milton, Jr. ............... F27D 7/00 432/152 |
| 4,150,494 | A | | 4/1979 | Rothchild |
| 4,918,828 | A | * | 4/1990 | Ruottu .................... F26B 3/283 34/273 |
| 8,893,402 | B2 | * | 11/2014 | Hamman ................. F27B 9/28 110/193 |
| 10,184,722 | B1 | * | 1/2019 | Ingle ...................... F26B 3/283 |
| 2003/0230003 | A1 | | 12/2003 | Miller et al. |
| 2006/0179680 | A1 | | 8/2006 | Miller et al. |
| 2010/0059036 | A1 | * | 3/2010 | Inoue .................. B29C 55/165 126/21 R |
| 2010/0112291 | A1 | * | 5/2010 | Nakai .................. G02B 5/0278 428/156 |
| 2010/0200126 | A1 | * | 8/2010 | Onozawa ................ C23C 2/285 118/66 |
| 2014/0013612 | A1 | * | 1/2014 | Lee ....................... F26B 21/004 264/165 |
| 2018/0056575 | A1 | * | 3/2018 | Resch .................... B29C 55/02 |
| 2018/0311866 | A1 | * | 11/2018 | Nishikawa ............ B29C 35/045 |

FOREIGN PATENT DOCUMENTS

| | | |
|---|---|---|
| CN | 100343041 | 10/2007 |
| CN | 102712133 | 10/2012 |
| CN | 203019692 | 6/2013 |
| CN | 103835187 | 6/2014 |
| CN | 204382682 | 6/2015 |
| CN | 205674474 | 11/2016 |
| DE | 1 604 804 | 4/1971 |
| DE | 36 16 328 | 11/1986 |
| DE | 4012628 | 10/1991 |
| DE | 92 13 802 | 1/1993 |
| EP | 1 441 192 | 7/2004 |
| EP | 1 616 690 | 1/2006 |
| GB | 1 058 200 | 2/1967 |
| JP | 2001158054 | 6/2001 |

* cited by examiner

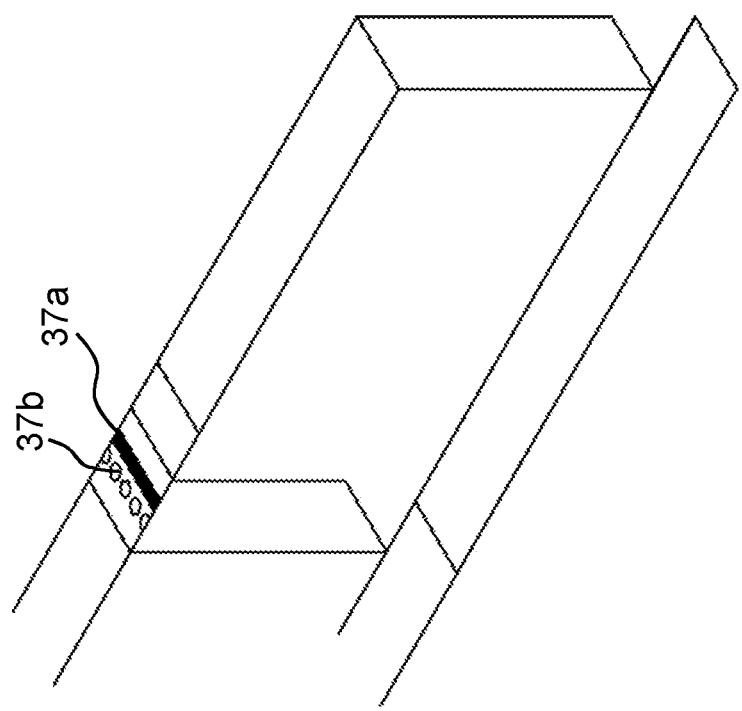

TREATMENT MACHINE FOR A FLEXIBLE MATERIAL WEB, IN PARTICULAR PLASTIC FILM, WHICH CAN BE PASSED THROUGH A TREATMENT FURNACE

This application claims priority to DE Patent Application No. 10 2018 124 521.1 filed 4 Oct. 2018, the entire contents of which is hereby incorporated by reference.

The invention relates to a treatment machine for a flexible material web, in particular in the form of a plastic film which can be passed through a treatment furnace as specified in the preamble of claim 1.

Such treatment machines are often film-stretching machines, which are used in particular in plastic film production. So-called simultaneous stretching machines are known, in which a plastic film can be stretched simultaneously in the longitudinal and transverse directions. Also known are so-called sequential stretching machines in which the plastic film is stretched in two successive stages, for example first in the longitudinal direction and then in the transverse direction (or vice-versa). Finally, purely longitudinal stretching and purely transverse stretching machines are also known.

As is known, in the production of a plastic film, the material web to be stretched is grasped at the two opposite film edges by means of clips, which are displaceably arranged on both sides of the material web to be stretched on circumferential guide rails. The clips are successively moved from an inlet zone (in which the edge of a plastic film to be stretched, for example, is detected) via a stretching zone (in which the opposing clips on the guide rail sections with a transverse component divergent to the transport direction are moved away from each other) to an outlet zone and then on a return path back to the inlet zone, in which case the film of the stretching zone still usually undergoes a certain relaxation and/or post-heat treatment downstream, for example in one or more treatment zones (annealing zone, cooling zone).

The plastic film must be subjected before, during and after the actual stretching process to different heating and/or cooling phases in the individual sections. As a result, the plastic film web to be stretched passes through a furnace which has successively different treatment zones (optionally also neutral zones in between). In these treatment zones, the plastic film to be produced is not only subjected to a different heat treatment, but, above all, a furnace air supply must be provided in order to always supply the furnace interior of the stretching installation with fresh air and to extract the polluted air.

Since such a treatment furnace is usually divided into several treatment sections in the form of treatment zones, the plastic film, e.g. the flexible material web in general, exits from one zone and enters a next zone, in which a treatment of the material web at other temperatures will in some circumstances take place.

Basically, a stretching machine is divided into several zones. For example, a preheating zone, a stretching zone, an annealing zone, and a cooling zone may be provided. The preheating and stretching zone can also be designed as a common zone. The cooling zones (but also, in principle, other zones) may be divided into several separate zones, for example into a first and second cooling zone, which are provided in succession, and a third cooling zone at the end of the stretching machine, which, for example, is separated by a neutral zone provided between the second and the third cooling zones. Such a neutral zone may, for example, also be provided between the stretch zone and the annealing zone (and then also in other places). In general, where one zone transitions into a neutral zone and the neutral zone then transitions back into a subsequent zone, an inlet gap and outlet gap (sometimes called an inlet slot and an outlet slot) are provided for the stretching furnace by the moving plastic film. Otherwise, the individual zones may also comprise several chambers, such as the annealing zone, which may have a plurality of chambers. There are generally no inlet and outlet gaps provided for the plastic film between the individual chambers of a zone.

Against this background, there is always the problem that, for example, in the region of an outlet from a treatment zone into a neutral zone, fluid is more or less taken along with the moving film, that is, "entrained". Similarly, upon entry of the plastic film from a neutral zone into a subsequent treatment zone, (ambient) air may also be introduced into the treatment space of the subsequent treatment zone. This leakage of fluid from one treatment zone to a neutral zone as well as the introduction of ambient air (present in a neutral zone) into a subsequent treatment zone is ultimately caused by the plastic film moving through the stretching furnace, thereby physically entraining adjacent fluid or adjacent air layers.

Thus, for example, if the plastic film emerges from a slot-shaped opening of a treatment zone, it takes fluid through the slot from the treatment zone, in which case the fluid has a corresponding zone temperature.

A similar problem occurs when fluid from the neutral zone (i.e. generally ambient air) is entrained by the plastic film and introduced into the subsequent treatment zone.

In general, the entrained fluid in particular is at a treatment temperature which is not optimal for this subsequent treatment chamber, because the corresponding entrained fluid is either too hot or too cool and changes the set temperature of the treatment chamber.

In addition to the fluid entrained by the film movement and caused by the different pressure levels in the overall furnace, an additional overlapping basic flow arises, which also reinforces the fluid exchange between the treatment chambers and/or between the treatment chambers of a subsequent neutral zone or a neutral zone and a subsequent treatment chamber.

However, insufficient partitioning of two different zones may not only cause a relatively uncontrolled emerging air flow over the entire film web, but, moreover, can lead to relatively uncontrollable pressure conditions. In the case of very wide plastic film webs and correspondingly unsteady air pressure ratios, air entrainment and an air extraction over the entire width of the plastic film web can take place simultaneously at the intended outlet gaps, whereby the plastic film web could be tempered differently over its width, which can lead to flatness problems in, for example, plastic films.

In combination, therefore, a basic flow due to the drag effect of the film and/or the existing pressure differences in the furnace sets in, which can lead to zones with a "wrong temperature". For example, hot air can flow into a cold furnace zone or, conversely, cold air can flow into a hot furnace zone.

This can, in principle, lead to a poorer film quality, i.e. poorer mechanical properties of the film due to incorrect heating or incorrect cooling, therefore at least due to non-optimal heating or cooling. These deteriorations occur especially when stretching the film.

Therefore, it has already been proposed to establish a thermal separation between two successive treatment chambers or treatment zones, specifically in the form of so-called neutral zones. Such neutral zones can be provided everywhere between two treatment zones, for example between the stretching and annealing zones or, for example, between the annealing zone and the cooling zone, and in some cases also before the last cooling zone.

However, it has been found that even the realisation of so-called neutral zones is not sufficient because an undesirably high level of fluid is introduced into the neutral zone at the outlet of the material web from a previous treatment zone due to the drag effect into the neutral zone or due to fluid from the neutral zone being entrained in an unwanted quantity into the subsequent treatment zone.

Therefore, attempts have been made to realise partitioning devices to further restrict or minimise the amount of the entrained gaseous medium entering and/or exiting a treatment chamber, typically a furnace.

According to DE 92 13 802 U1, a partitioning device for a stretching machine, in particular a wide stretching machine for plastic film webs, has been proposed in which treatment zones offset from one another in the extraction direction of the film web are formed. These each have an inlet or outlet gap through which the film web to be extracted enters or exits. For this purpose, a floating nozzle is described, whereby a gap limitation predetermined for the film inlet or film exit should be limited in its effect. For this purpose, this nozzle outlet opening is directed substantially tangentially to the film web and/or permits a flow of the gaseous medium flowing through the nozzle outlet opening substantially tangentially to the plane of the film web, in which case the gap limitation formed on the side of the film web opposite the floating nozzle can be adjusted in its distance to the film web.

Thus, as dealt with in the aforementioned DE 92 13 802 U1, it is also conceivable to arrange an upper and a lower nozzle on both sides of a film web, whereby, for example, air could be blown transversely to the plane of the film web to produce an air cushion arranged on both sides. However, according to DE 92 13 802 U1, such air locks, by means of which a partition between the zones should be made possible, may not be set over a larger film width in such a way that a uniform and smooth extraction movement of the film web would always be ensured.

Against this background, it is the object of the present invention to provide a further improved solution for a partitioning device for a treatment zone, in particular in the form of a treatment or stretching furnace for moving material webs, in particular in the form of a plastic film web to be stretched.

The object is achieved according to the features specified in claim 1. Advantageous embodiments of the invention are specified in the dependent claims.

It must be considered quite surprising that, in the context of the invention, a significant improvement of a partitioning effect with respect to the individual furnaces and thus the individual treatment zones or treatment chambers can be achieved.

In the context of the invention, at least at the transition from a treatment zone to a neutral zone and/or at the transition from a neutral zone to a treatment zone, suitably adjustable partitioning walls are used, for example in the form of adjustable or foldable metal sheets (sometimes also referred to as "shutters" or also as "air shutters"). These can be displaced with respect to the moving material web, so that the distance between the closing edge or boundary edge facing the moving web of material and the plane of the material web itself is minimised. As a result, the existing inlet or outlet gap for the moving flat material web can already be largely minimised in order to minimise the entry or exit of a gaseous medium into or out of the treatment or stretching furnace. A shutter is thus a setting device limiting the gap height for the film to be passed through, which can be referred to as a type of adjustable louvre, an adjustment and/or closing flap, or an aperture.

At the furnace inlet and the furnace outlet, other shutter solutions are usually chosen.

The advantages according to the invention can be realised even more comprehensively and with an even better effect if, in addition to these adjustable partitioning walls, which are sometimes referred to as air shutters, an air curtain is applied, which, in the extraction direction of the moving material web, preferably follows an outlet gap from a treatment zone into a neutral zone and/or is preferably provided or positioned in front of an inlet gap at the transition from a neutral zone into a treatment zone.

In this case, a planar air jet is generated, which is placed on the partition wall (shutter plate), so that the course of the partition walls then serves as a further leading or guide plate to guide and stabilise the gaseous media beam directed towards it in the direction of the moving material web. In this case, the air jet runs more or less in the area adjacent to the material web parallel to the partitioning wall (shutter plate), and more or less perpendicular to the plane of the moving material web, so as to "block" the inlet and/or gap.

In this respect, the physical principle of the so-called Coanda effect is basically exploited, which describes how moving fluid streams, for example also gas streams, follow the upper side of a boundary wall, virtually "not detaching" therefrom, with the result that due to the Coanda effect, for example a gas or air flow would even follow a convex curvature of an adjacent wall.

By means of the measures described, no further gaseous medium (at least in a relevant amount) can, in the region of the inlet gap, enter into a treatment zone or, in the region of an outlet gap, emerge from a treatment zone. In this case, during actual application, such a partitioning device is provided both on the top and on the underside of the moving material web, i.e. on both opposite sides of the moving material web, in which case partitioning walls provided on the inlet and outlet sides are preferably designed as continuous walls, whose inlet or outlet gap is at least slightly wider than the width of the material web moving through it.

In other words, therefore, the gaseous media jet (hereinafter sometimes referred to as a fluid jet) acts as a barrier flow against the furnace base flow and thus prevents the inflow of air from a neutral zone or its outflow into a neutral zone. As a result, doing so above all prevents a gaseous medium from emerging from a treatment zone, for example flowing through a subsequent neutral zone and being introduced into a subsequent further treatment zone via the inlet gap thereof.

In addition to the aforementioned solution, said action and effects can, alternatively or even cumulatively, be achieved by the gaseous fluid jet area being blown onto the moving material web at a temperature which is more or less identical to the temperature of the adjacent preceding and/or subsequent zone. The flow speed of the jet can in this case be varied depending on the application. Speeds in the range of 5 to 25 m/s have proven to be particularly favourable.

In one respect, the advantages of the invention are, e.g., the aforementioned reduction or suppression of the basic furnace flow (across the inlet or outlet gaps of the corresponding zones), hence also a stabilisation of the moving material web, in particular in the case of a plastic film. This is especially true, for example, when passing a plastic film through a corresponding shutter gap (inlet or outlet gap).

In this case, the advantages according to the invention are better realised the closer the corresponding demarcation or partition walls are, that is, in particular the closer the so-called shutter plates are brought to the moving material web, for example in the form of a plastic film web.

If, for example, a plastic film web exhibits greater slack or passes through greater deflections in the vertical direction, the air shutter provided according to the invention would ensure, in the manner of a so-called fluid free jet, a safe distance between the moving material web on the one hand and the boundary edge running adjacent thereto (whereby an inlet or outlet gap is limited). As a result, damage to the moving material web, in particular in the case of a plastic film web, or a film tear, can be prevented.

Another advantage of the solution according to the invention is that a defined heat transfer is possible by means of the air-shutter jet, which is stable over the working width and can be referred to as a fan-shaped or rather planar gaseous jet. This jet can be used, for example, to heat or cool the moving material web, in particular in the case of a plastic film web, to a predetermined temperature level.

The invention can be used in a wide variety of machines. The air-shutter principle according to the invention can be used in all film-stretching machines with film heating by hot air. It has also been found that the solution according to the invention can be realised and lead to the desired advantages both in simultaneous and in sequential film-stretching machines, or in purely longitudinal or transverse stretching systems. Experiments have also shown that the advantages of the invention can be achieved even if the moving web is moved at different speeds through the individual zones, hence, for example, at more than 50 m/min, in which case the benefits were still feasible even if the speeds increased above the above values, for example, up to 700 m/min.

The initially preferred slightly oblique blowing against the shutter partition walls (i.e., the so-called shutter plates), usually at an angle of less than 45°, preferably less than 40°, 35°, 30°, 25°, 20°, 15° or even less than 10°, can be similar to the heating or cooling devices used in the individual zones (or furnaces) by means of air nozzle boxes, which are operated or heated by fans and heat exchangers. The extraction of the gaseous fluid jet can, for example, be realised centrally via an outlet region provided remotely from the plastic film web and provided in a ceiling construction of the machine, or also, for example, via separate exhaust boxes. Additionally and alternatively, it is also possible to provide the extraction for the gaseous fluid jet centrally below the plastic film web, for example, via a floor construction remote from the plastic film web.

With regard to the gaseous fluid stream used, usually in the form of air, it does not require compliance with certain limit values or parameters. In any case, the temperature of the gaseous fluid stream/air is critical, since the effects can be further improved as a function of the temperatures. It is quite possible that, for example, air from a respective adjacent zone is also used, or that, for example, heated fresh air is used to be blown by means of the air shutter device in the direction of plastic film web.

The device for generating air shutter air or a generally gaseous fluid stream can occur, for example, via slotted nozzles, but also via hole nozzles, whereby the production of the nozzle box for blowing against a shutter in this manner is simplified again. Likewise, combinations of, for example, hole and slotted nozzles are also possible.

The extraction of the introduced gaseous medium takes place either in the immediate vicinity of the fluid film or at some distance therefrom. In the exemplary application of the air shutters at the inlet and outlet of a neutral zone, the extraction should take place within the neutral zone. This results in the characteristic fluid flow rollers, which additionally stabilise the barrier flow jet.

Figure 2:
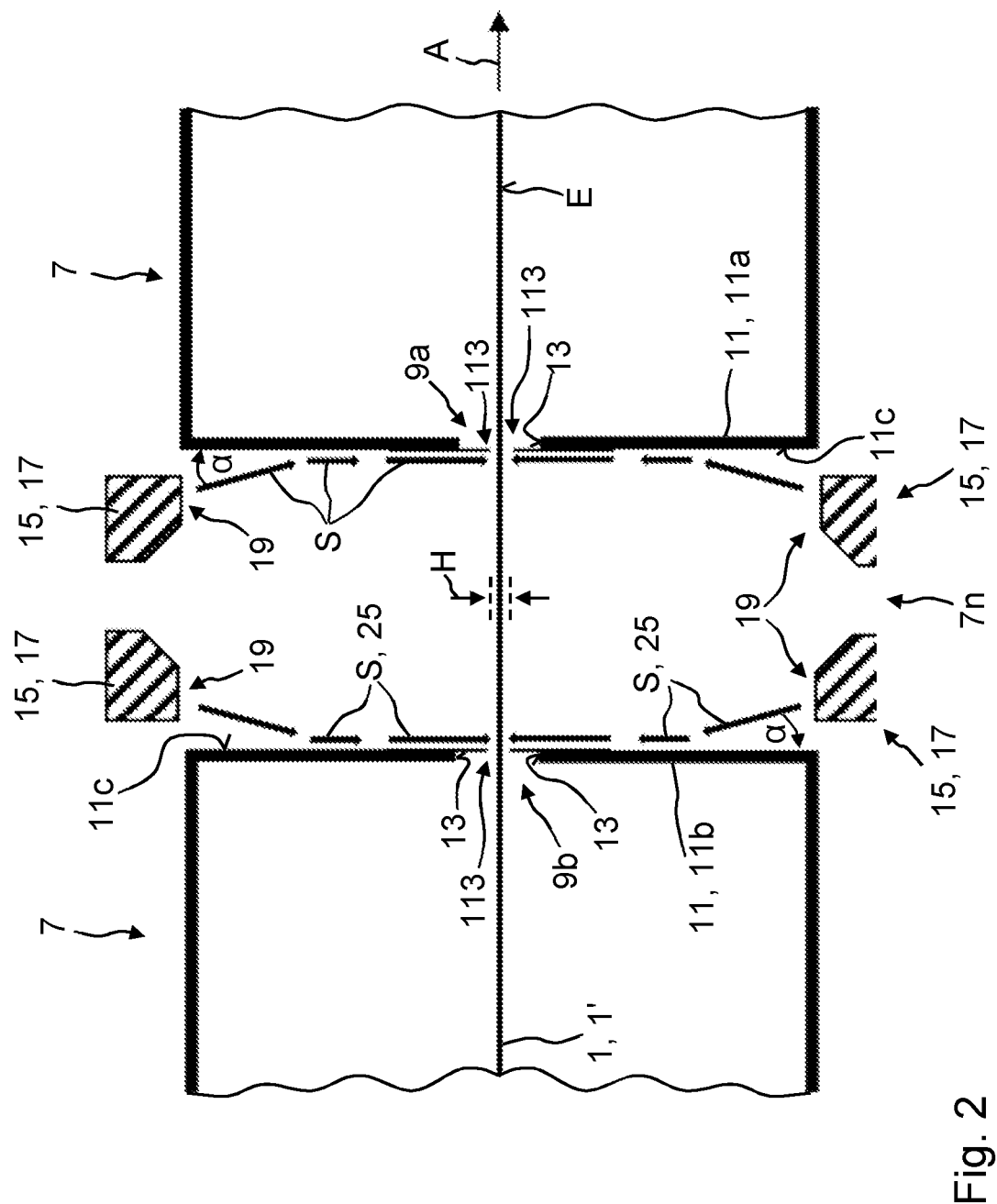
Figure 3:
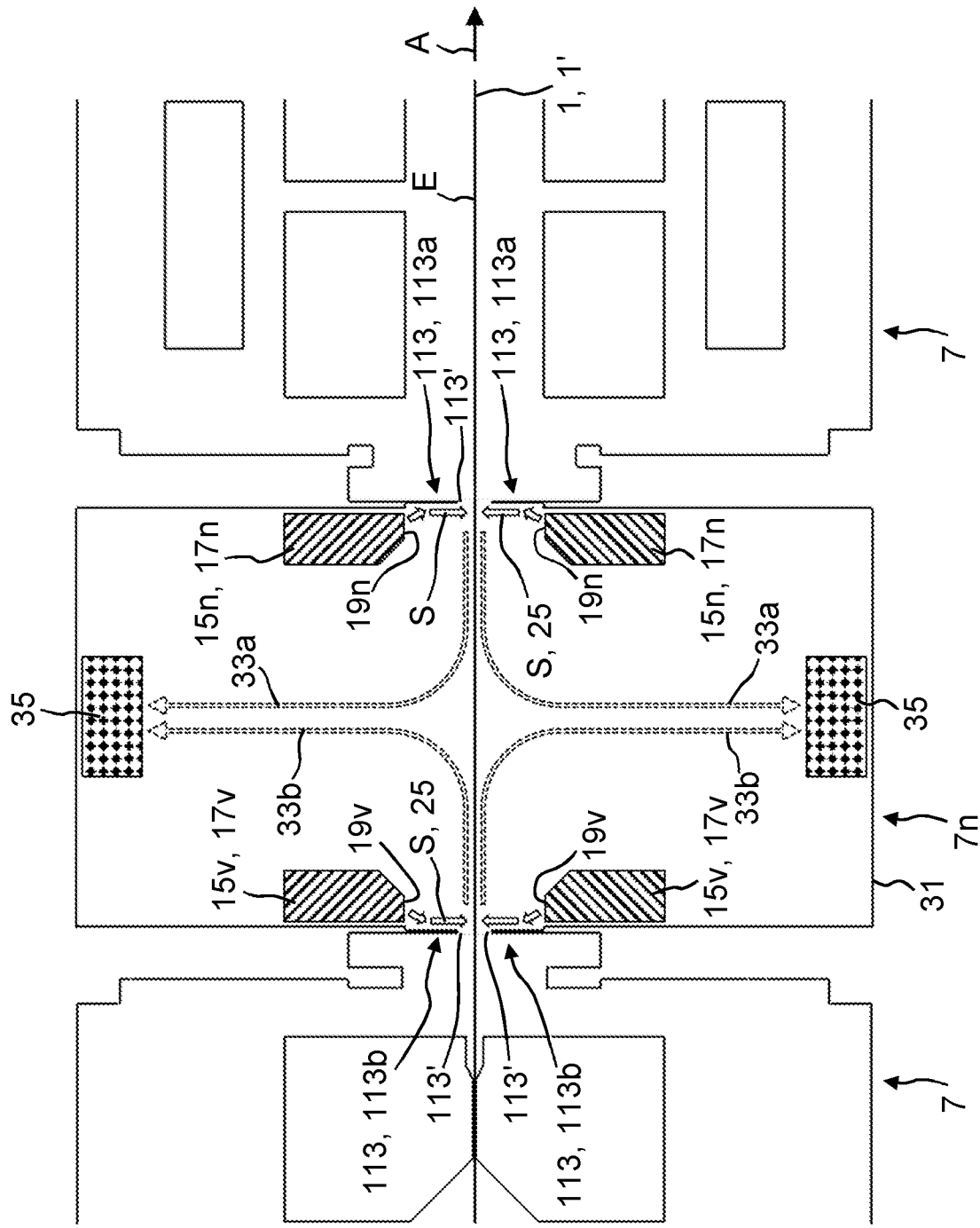
Figure 4:
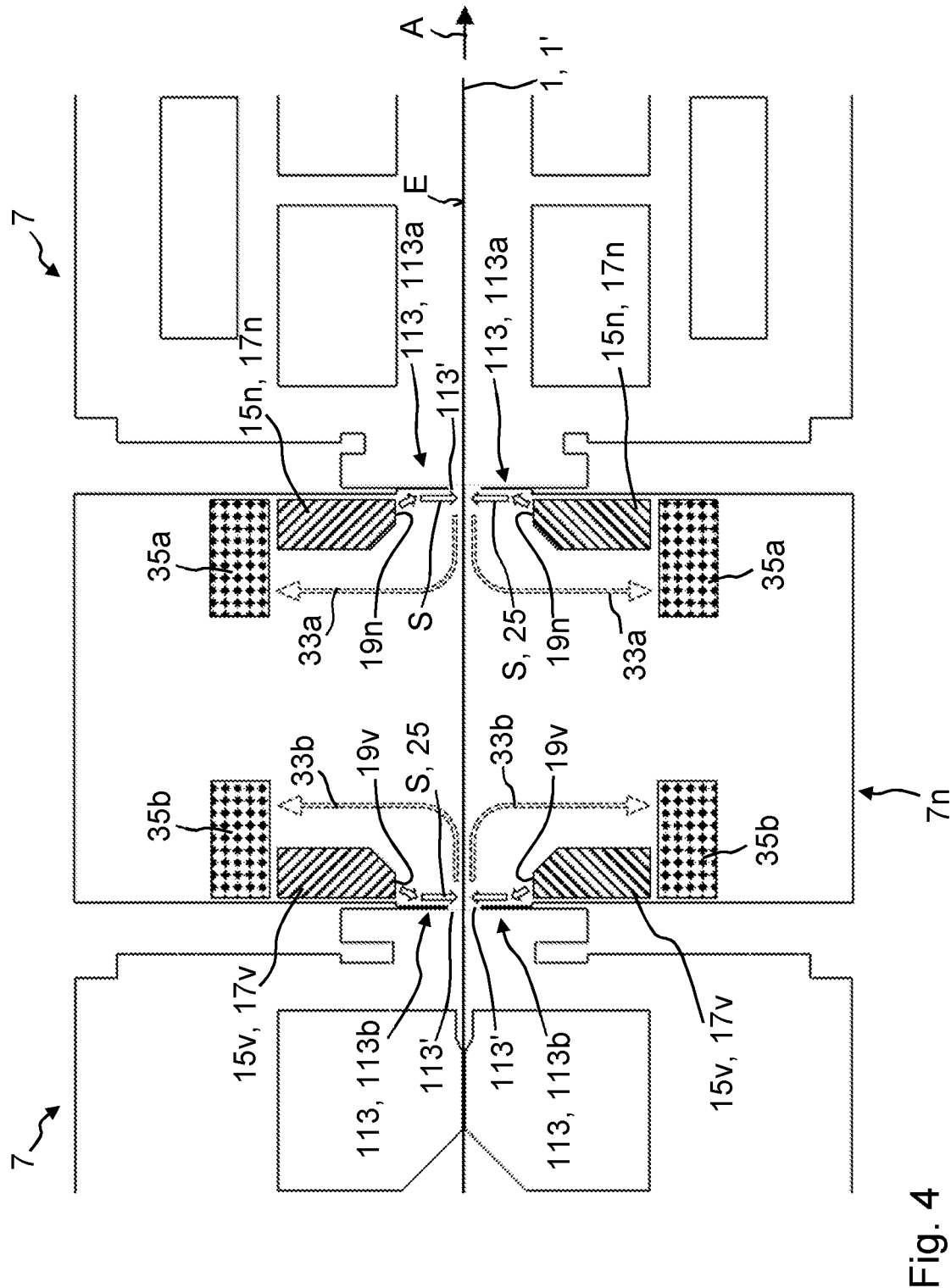
Figure 6:
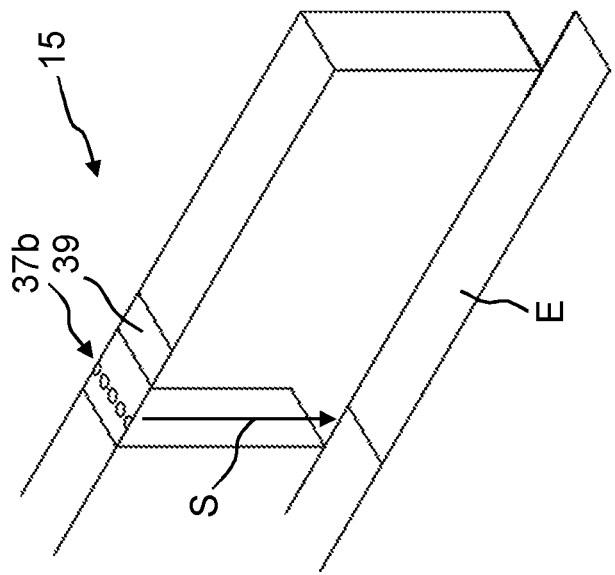
Figure 5:
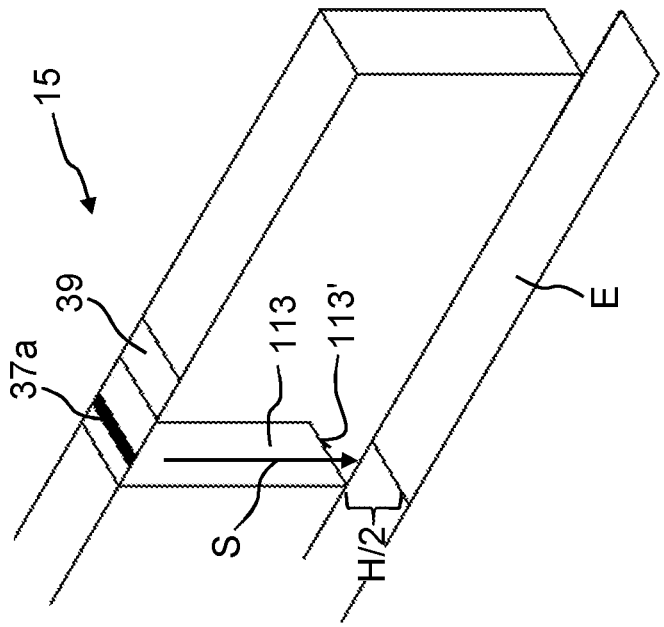

The invention will be explained in more detail hereinafter with reference to drawings. In detail:

FIG. 1: is a schematic side view of a furnace arrangement for a plastic film stretching machine;

FIG. 2: is a schematic simplified cross-sectional representation perpendicular to the moving material web to clarify the air shutter principle;

FIG. 3: is an enlarged detail view of a first exemplary embodiment of the invention;

FIG. 4: is a further representation of a solution principle according to the invention for a modified exemplary embodiment;

FIG. 5: is a disc-shaped sectional illustration to clarify the use of slotted nozzles;

FIG. 6: is a representation corresponding to FIG. 5 using hole nozzles; and FIG. 7: shows a different exemplary embodiment of a nozzle arrangement using a slotted nozzle and a hole nozzle.

In FIG. 1, a schematic longitudinal sectional view of a machine 3 is shown, in particular a film stretching machine 3', with a stretching furnace 3", wherein a material web 1, i.e., for example, a plastic film 1', is passed through the film stretching machine 3' and thus through the stretching furnace 3" in the extraction direction A. The machine 3, in particular in the form of a film stretching machine 3', may be a simultaneous stretching unit or a sequential stretching unit, in which longitudinal and transverse stretching is not performed simultaneously (as in the simultaneous stretching machine), but first only in the longitudinal and then in the transverse direction or vice-versa. In principle, it can also be a transverse stretching machine.

A corresponding machine includes, for example, a corresponding housing structure 5 with a plurality of successive zones 7. In the case of a plastic film stretching machine, the zones 7 are usually treatment zones 7, which are separated from each other by a neutral zone 7n. In this case, the individual treatment zones may comprise not just one but, for example, two or generally several treatment chambers 7'. In this case, all treatment zones 7 form the stretching furnace 3", which is traversed by the moving material web 1, in particular in the form of the plastic film 1'.

The structure is usually symmetrical to the plane E, on which the moving material web 1 is moved through the machine. But asymmetrical structures are also possible.

The individual treatment zones 7 in each case have an inlet gap 9a on the zone inlet side and an outlet gap 9b on the outlet side, which gaps are dimensioned highly and widely enough that the material web 1 can be moved through this slot arrangement without touching the boundary edges of the inlet and/or outlet gap or slot 9a, 9b in order to avoid damage to the material web, in particular in the form of the plastic film.

As shown schematically with reference to FIG. 1, the plastic film, which in particular is moved through the machine, can be heated to different temperatures in the individual zones. So-called neutral zones 7n may also be provided between the individual zones in order to separate two consecutive zones more strongly, so that no gaseous treatment fluid can easily pass from one zone 7 into a subsequent further zone 7. In order to prevent possible drag effects of the entrainment of gaseous treatment fluid from one zone into a subsequent zone—caused by the moving material web—various measures are provided according to the invention.

A neutral zone 7n, which is arranged between zones 7 extending in the extraction direction A, is shown in detail on the basis of the schematic cross-sectional illustration according to FIG. 2.

On each input and output side, the individual treatment zones 7 comprise zone walls 11, i.e. usually a zone inlet wall 11a and a zone outlet wall 11b, which may hereinafter be named a shutter wall, a shutter boundary wall, or a shutter plate.

The aforementioned inlet and outlet gaps 9a, 9b are provided in these zone walls 11, in which context—relative to the neutral zone 7n shown in FIG. 2—the leading slot or gap in the running direction A of the film is referred to as the outlet gap, and the gap 9b provided in the extraction direction after the neutral zone 7n in the subsequent inlet zone wall 11a is referred to as inlet gap 9a.

The columns each have boundary edges extending substantially parallel to the plane E of the moving material web 1, namely boundary edges 13 which run generally parallel to the plane E. These boundary edges should, as far as possible, converge with the film plane E in order to keep the height H of the slot arrangement as small as possible. The smaller the slot height H, the less gaseous fluid can enter from a treatment zone or into a next treatment zone. The corresponding zone walls 11 or so-called shutters or shutter plates 113 are therefore preferably variously adjustable, in such a way that their boundary edges 113' can be adjusted to an optimal distance with respect to the plane E of the moving material web. It must be taken into account that under no operating conditions does the material web 1 touch, for example, the boundary edges 13 of the zone walls 11 or the boundary edges 113' of the actual adjustable shutter or shutter plate usually protruding over the boundary edges 13 in the direction of material web 1, as a result of which a slot or a relevant gap is formed through which the material web 1 is moved. And it must be avoided that this leads to a contact, which can lead to film damage or film breaks.

In the exemplary embodiment shown, the zone walls 11 in the form of the shutter boundary walls or shutter plates are oriented perpendicular or substantially perpendicular to the plane E of the moving material web and run perpendicular to the material web 1, i.e. perpendicular to the plane E of the plastic film 1' and thus also perpendicular to the reference direction A of the material web 1.

In the exemplary embodiment shown, a nozzle arrangement 15 is in each case arranged adjacent to a shutter plate 11, specifically outside the actual treatment zones 7. In the case of the neutral zone 7n, therefore, the two nozzle arrangements 15 are provided in the neutral zone 7n.

The nozzle arrangements 15 comprise a nozzle device 17 with a nozzle outlet opening 19, whereby a gaseous fluid jet S is generated, which is aligned at an angle α to the adjacent zone wall 11, i.e. to the adjacent shutter boundary wall or the shutter plate.

As a result, a gaseous fluid flow S is generated, as shown by the arrows 25 in FIG. 2.

The blowing angle α should be comparatively small, usually set below 45°. Preferred values are below 40°, 35°, 30°, 25°, 20° and in particular below 15° or even below 12.5°, 10°, 8°, 7°, 6°, 5°, 4°, 3°, 2°, or less than 1°, wherein the angle is usually greater than or equal to 0°.

Due to the Coanda effect, this has the consequence that the gaseous fluid stream S, after striking the surface 11c of a shutter boundary wall, then flows along this shutter boundary wall in the direction of the material web 1 and essentially does not release from this surface due to the Coanda effect.

If, in this case, the surface 11c and/or the shutter boundary wall 11 in general are aligned perpendicular to the film plane E, the fluid flow S also strikes the material web 1 more or less perpendicularly, as shown schematically in FIG. 2. According to the orientation of the surface 11c of the shutter wall 11 or the shutter wall 11 itself, therefore, the angle of incidence of the fluid flow S with respect to the plane E of the material web 1 is more or less fixed.

The fluid jet S thereby moves as far as the lower boundary edge 13 of a shutter plate 11 and beyond the lower boundary edge 13 in the direction of the material web 1 until the fluid jet S more or less directly strikes the film plane E.

The nozzle arrangements 15 and/or the nozzle devices 17 and/or the nozzle outlet openings 19 are thus designed and/or arranged and/or aligned such that the respective gaseous fluid flow S is thus introduced and/or placed or applied to the zone outlet wall 11b or to the leading neutral zone wall 113b (FIGS. 3 and 4) or the zone inlet wall 11a and/or to the trailing neutral zone wall 113a (FIGS. 3 and 4) such that the gaseous fluid stream S, after hitting the respective wall of the zone exit wall 11b or the leading neutral zone wall 113b and the zone inlet wall 11a and/or the trailing neutral zone wall 113a, then flows as far as the material web 1. This applies to all exemplary embodiments of the invention.

In other words, therefore, a planar air jet is generated, which is placed on the corresponding walls, for example, the partitioning wall (shutter plate), so that the course of these walls or partitioning walls then continues to serve as a leading or guide plate in order to continue to guide and stabilise the gaseous media jet directed toward said walls in the direction of the moving material web. In this case, the air jet runs more or less in the area adjacent to the material web in a direction parallel to the partitioning wall (shutter plate), and, specifically, more or less perpendicular to the plane of the moving material web, so as to "block" the inlet and/or gap.

As a result of this gaseous fluid flow, the part of the respective inlet and outlet slots 9a, 9b running basically above the film web, but also the remaining region of the inlet or outlet gap 9a, 9b extending below the film web, is closed, since the corresponding nozzle arrangement 15 is provided with the aforementioned nozzle device 17, preferably above and below the plane E of the moving material web.

In order to improve the effect of "blocking" the respective gap opening, the gaseous fluid stream S is heated in each case to a temperature range which corresponds to the temperature in the respectively adjacent treatment zone 7.

If, for example, the circulating air is heated to a temperature range $T_1$ in the treatment zone 7 upstream of the neutral zone 7n in the extraction direction, the gaseous fluid flow S is preferably also heated to this temperature range $T_1$ for closing the outlet gap 9b.

If, for example, a plastic film is heated in a treatment zone 7 subsequent to the neutral zones 7n shown in FIG. 2 to a temperature zone $T_2$ deviating from the temperature range $T_1$, then this gaseous fluid stream S in the area of the inlet gaps 9a of the subsequent treatment zone 7 is likewise preferably heated to this temperature range $T_2$, i.e., so that the gaseous fluid stream S is preferably intended to be heated to the temperature which corresponds to the temperature of the gaseous fluid (usually air) flowing around in the subsequent treatment zone 7. In this case, the heated gaseous fluid stream S should preferably differ less than 20° C., in particular less than 15° C., less than 12.5° C., and in particular less than 10° C., 8° C., 6° C., 5° C., 4° C., 3° C., 2° C. or 1° C. from the respective temperature of the gaseous medium in the adjacent treatment zone.

One possible implementation of the invention is shown in greater detail with reference to FIG. 3. In the variant according to FIG. 3, a neutral zone 7n, which is likewise delimited by a housing arrangement 31, is again provided between adjacent leading and trailing treatment zones 7.

Within this housing arrangement for the leading, adjacent zone 7 (in the extraction direction A), a schematic cross-sectional view shows a first nozzle arrangement 15v with a nozzle device 17v with nozzle outlet openings 19v as well as, adjacent thereto, a further trailing nozzle arrangement 15n with a nozzle device 17n arranged next to the subsequent inlet slot 9a of a subsequent zone 7, which has a nozzle outlet opening 19n.

The nozzle arrangement 15 and/or the nozzle outlet opening (19v, 19n) is designed such that it extends over the entire width of the material web 1 or deviates by less than +/−20% and in particular by less than +/−10% therefrom.

The arrangement is—as described above with reference to FIG. 2—oriented in order to generate a corresponding gaseous fluid jet S at an angle α to the adjacent shutter boundary wall 11.

The gaseous fluid flow S moved forward as far as the film level E via the respective boundary edge 113' of the shutter or shutter plate 113, the distance of which from the material web 1 is adjustable, is then deflected as indicated by the arrows 33a and 33b. The gaseous fluid id stream S, which is generated by a leading nozzle arrangement 15v with respect to an upstream treatment zone 7 in the extraction direction A of the plastic film, is deflected in the extraction direction A of the film according to arrow 33b, and then, optionally, away from the material web plane E approximately in the central region of the neutral zone 7n, specifically as far as an extraction device 35, which is remote from the material web.

The gaseous fluid flow S produced by the subsequent zone in the extraction direction A, while avoiding entry through the inlet gap 9a, moves into the following zone 7 in the opposite direction to the extraction direction A of the film in the neutral zone 7n, until it is also is moved away from the film plane E approximately in the central region of the neutral zone 7n according to the arrow 33a, specifically as far as the likewise aforementioned extraction device 35.

The two extraction devices 35 can be chosen to be very different in their design and arrangement.

With reference to a further schematically shown exemplary embodiment based on FIG. 4, it is illustrated that, on each side of the web 1, instead of, for example, an extraction device 35 placed remotely in common with the film plane E, a separate extraction device 35a or 35b may be provided for each nozzle arrangement, which separate extraction device, for example, is arranged remotely from the film plane E, on the rear side of the respective nozzle assembly 15. The path of the extraction and the flow direction of the gaseous fluid flow S is similar in both cases, however, since the leading nozzle arrangement 15v arranged in the extraction direction in the neutral zone 7n generates a fluid flow which initially runs in the extraction direction A of the plastic film, in order to be led away in the direction of the extraction device 35a, whereas the nozzle arrangement 15n (which is associated with a subsequent treatment zone 7) arranged in the subsequent neutral zone 7n flows initially opposite to the film extraction direction A along the film plane E, in order to then be deflected in the rear area behind the nozzle box, where the corresponding extraction device 35b is arranged.

Finally, it should be further added in regard to the exemplary embodiments of FIG. 3 and FIG. 4 that, in the neutral zone 7n, the nozzle and extraction devices are preferably also housed in the aforementioned housing device 31, said devices also comprising, for example, neutral zones and walls 113a and 113b which are also offset relative to one another in the extraction direction A, said zones and walls being arranged on the inlet side and outlet side relative to the extraction direction A of the material web 1. These neutral zone walls 113a, 113b preferably extend parallel to the respectively adjacent chamber inlet or chamber outlet walls 11a, 11b, even if—as shown in FIG. 3 and FIG. 4—the predominant height of said walls exhibits a lateral distance relative to one another in the extraction direction A.

Preferably, at least in a partial height adjacent to the plane E, a wall section is then provided, which can either be part of a chamber wall 11a, 11b of a zone 7, and/or part of the neutral zone walls 113, i.e. specifically of the neutral zone walls 113a, 113b. This wall section is then applied to the film plane E to the extent that the respective inlet gap 9a or outlet gap 9b is formed between the opposite boundary edges 13.

With reference to FIG. 5 and FIG. 6, it is then shown schematically in the form of a disc-shaped sectional view with respect to a nozzle assembly 15 that the gaseous fluid stream S can, for example either via a slotted nozzle 37a or a hole nozzle arrangement 37b escape slightly obliquely in the direction of the shutter wall 11 and/or shutter plate 113, in other words being blown out in this direction, in order to then flow along the shutter boundary wall 11 and/or the neutral zone wall 113 parallel thereto and over the shutter or shutter plate seated there, and away in the direction of the film plane E (as indicated by the arrow S), whereby, in FIG. 5 and in FIG. 6, half the gap height $H_{1/2}$ is still indicated. Gaseous fluids located in an upstream zone 7 could escape therethrough, which is intended to be prevented by the shutter device. In practice, the fluid flow S will indeed run over its path in a direction predominantly perpendicular to the plane E, but, in the region of the gap opening to the adjacent leading or trailing zone possibly, it will be slightly obliquely deflected with respect to the plane E of the material web 1.

In FIGS. 5 and 6, an extraction region 39 is also shown, which, for example, corresponds to the extraction opening 39 in the extraction device 35. In the variant according to FIG. 5 and FIG. 6, the extraction opening 39 is arranged at the level of the nozzle opening 37a and 37b in order to make it clear that the extraction opening 39 can be provided in a different construction for the various variants of the extraction device 35, for example in the neutral zone 7n. The aforementioned nozzle openings may also be formed higher or lower, so that the extraction openings 39 are then located at a different height relative to the nozzle opening.

The nozzle arrangement is such that the gaseous fluid flow at the height of the material web 1, or at least also at the level of the inlet or outlet gap 9a, 9b, extends so broadly in the transverse direction of the material web 1 that the fluid flow impinges onto the material web 1 across the entire width, while covering about half the gap on each side of the remaining material web, so that the respective inlet or outlet gap is covered by this gaseous fluid flow and thus is virtually "closed" by this gaseous fluid flow. Therefore, the nozzle arrangement is provided or arranged in the transverse direction over the material web 1 with a width such that the gaps are completely covered by the fluid flow. However, it is also possible that the outlet nozzles are provided and/or formed only in a smaller width relative to the material web, but then being split in such a flat or fan-shaped manner that the fluid flow, at least at the level of the inlet and/or outlet gaps 9a, 9b, is so fanned out that the gaps are essentially closed by the gaseous fluid flow to be moved to the material web.

In contrast to FIGS. 5 and 6, FIG. 7 shows a variant in which a corresponding nozzle arrangement comprises both a slotted nozzle 37a and a preferably parallel hole nozzle 37b.

The invention claimed is:

1. A treatment machine for flexible material webs in the form of a plastic film, comprising:
    at least two successive zones in an extraction direction of the material web,
    at least one neutral zone is provided between the at least two successive zones in the extraction direction,
    the zone upstream from the neutral zone comprises a zone outlet wall provided with an outlet slot and/or a neutral zone wall, through which the material web exits in the extraction direction from the upstream zone into the neutral zone,
    the zone subsequent to the neutral zone in the extraction direction, comprises a zone inlet wall and/or a neutral zone wall, which is provided with an inlet slot through which the material web enters the trailing zone in the extraction direction,
    in the neutral zone, a nozzle arrangement is provided, adjacent to a zone exit wall and/or a leading neutral zone wall on the one hand, and/or adjacent to the zone inlet wall and/or a trailing neutral zone wall on the other hand, via which nozzle arrangement is provided, via which a gaseous fluid flow reaching a material web is generated,
wherein: the nozzle arrangement of the nozzle arrangement leading in the neutral zone and/or the nozzle arrangement trailing in the neutral zone and/or a nozzle outlet opening of the nozzle arrangement is designed and/or arranged in such a way
    that a gaseous fluid flow (S) is generated,
    that the gaseous fluid flow is directed at an angle of greater than 0° and less than 45° in the direction of the adjacent zone exit wall and/or the leading neutral zone wall or the zone inlet wall and/or the trailing neutral zone wall,
wherein
    the angle is an angle enclosed between the wall the gaseous fluid flow is directed on and the gaseous fluid flow, and wherein
    the wall the gaseous fluid flow is directed on is formed as a guide plate that is configured to guide and stabilize the gaseous fluid flow in the direction of the moving material web due to the Coanda effect, and
    that the nozzle arrangement is formed such that the gaseous fluid flows following the zone exit wall or the leading neutral zone wall or the zone inlet wall and/or the trailing neutral zone wall as far as the material web.

2. The treatment machine according to claim 1 wherein the nozzle arrangements comprise nozzle outlet openings, which are designed or aligned in such a way that the gaseous fluid flow emerging therefrom is directed at a blowing angle against the adjacent zone outlet wall or zone inlet wall, which is less than 40°.

3. The treatment machine according to claim 1, wherein the treatment machine is designed in such a way that the gaseous fluid flow supplied in the leading neutral zone is heated to a temperature range corresponding to the treatment temperature in the leading zone or deviating from this temperature by less than 10° C. and/or that the gaseous fluid flow fed in the extraction direction through the trailing neutral zone is heated to a temperature which corresponds to the treatment temperature in the following zone or deviates from that temperature by less than 10° C.

4. The treatment machine according to claim 1, wherein the treatment machine is designed in such a way that the gaseous fluid flow exiting into the neutral zone is heated to a temperature which is less than 20° C. from the respective treatment temperature which is provided in the zone arranged upstream of the extraction direction with respect to the neutral zone or the zone located subsequent thereto.

5. The treatment machine according to claim 1, wherein the nozzle arrangements comprise nozzle openings consisting of a hole nozzle arrangement and/or a slotted nozzle arrangement.

6. The treatment machine according to claim 1, further comprising a common exhaust device for the gaseous fluid flow exiting via the respective leading or trailing nozzle arrangements, wherein the common exhaust device is disposed between the leading and trailing nozzle arrangements in a position remote from the material web.

7. The treatment machine according to claim 1, wherein each of the leading and trailing nozzle arrangements is associated with a separate exhaust device, which is arranged adjacent to the plane of the material web or more remotely relative to the plane of the material web.

8. The treatment machine according to claim 1, wherein the neutral zone is associated with a housing device in the form of a separate housing device.

9. The treatment machine according to claim 8, wherein in a neutral zone, wherein the leading and trailing nozzle arrangements are arranged within this separate housing device.

10. The treatment machine according to claim 1, wherein the zone inlet wall, the zone outlet wall and/or the neutral zone walls are aligned at an angle of 90° to the plane of the material web.

11. The treatment machine according to claim 5, wherein the nozzle arrangement and/or the nozzle opening is designed such that it extends over the entire width of the material web.

12. The treatment machine according to claim 1, wherein the nozzle arrangement is designed such that a planar and/or fan-shaped gaseous fluid flow is generated which, at least at the level of the inlet and/or the outlet gap, extends or is spread over the width of the inlet and/or outlet slot.

* * * * *